July 24, 1928.
C. E. MENSING ET AL
1,678,154
SPECIAL PACKAGE OF HYDROSCOPIC MATERIAL
Filed Nov. 10, 1926
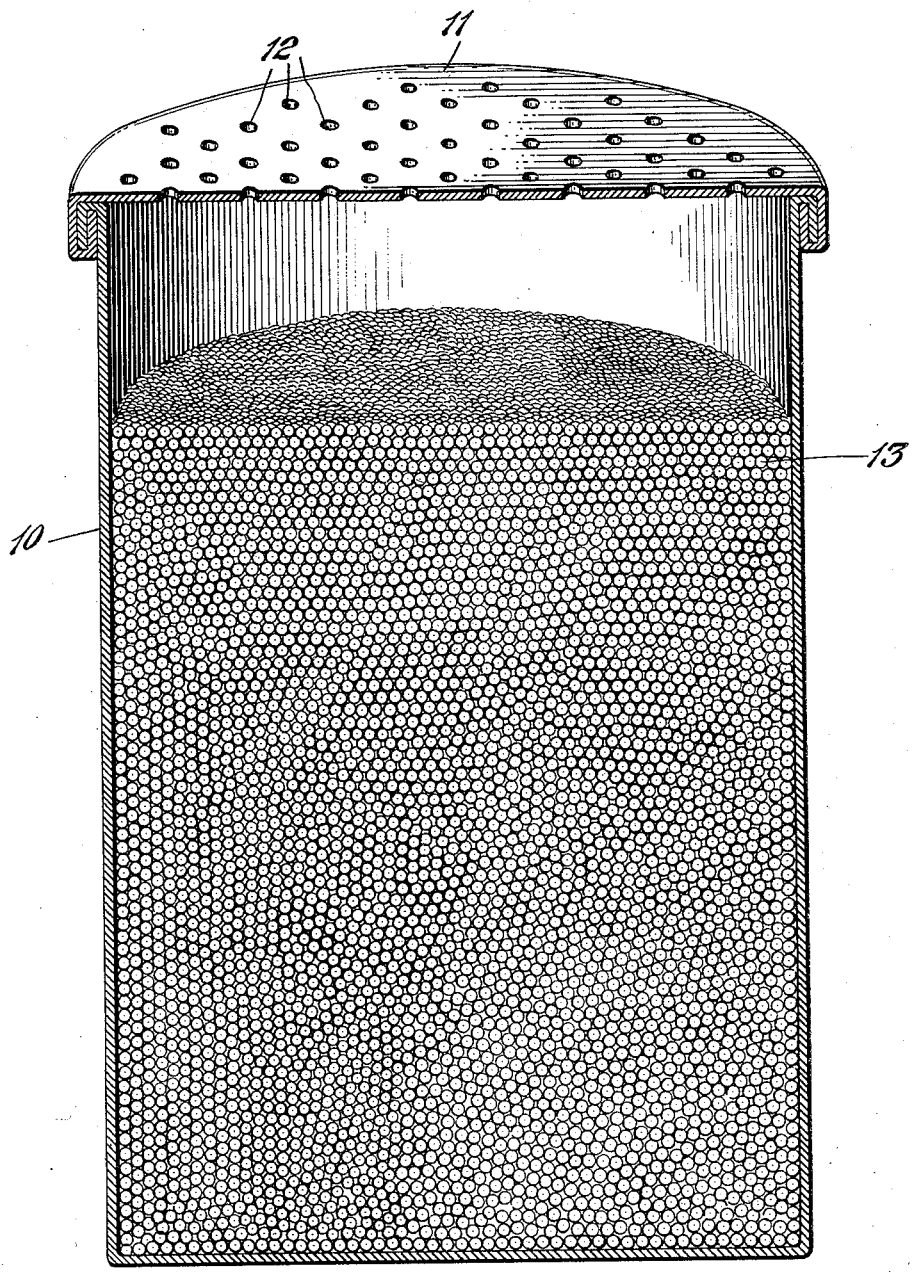
INVENTORS
Carl E. Mensing
and Roy E. Wiley
by Robert W Byerly
Their ATTORNEY Patented July 24, 1928.

1,678,154

UNITED STATES PATENT OFFICE.

CARL E. MENSING, OF SOMERVILLE, AND ROY E. WILEY, OF PLAINFIELD, NEW JERSEY.

SPECIAL PACKAGE OF HYDROSCOPIC MATERIAL.

Application filed November 10, 1926. Serial No. 147,428.

This invention relates to a special package of hydroscopic material, and aims to provide for dispensing such a material in small and regulatable quantities.

By the expression "hydroscopic material" we mean any material which on exposure to damp atmosphere absorbs water and thereby tends to coalesce regardless of whether or not the absorption of moisture by the material is the result of a chemical change in the material produced by the atmosphere.

It has long been customary to provide packages of numerous different sorts of hydroscopic substances, including condiments, cleaning materials, etc., such, for example, as common salt, nitre cake, and numerous other chemicals, in finely ground form and enclosed in a box or can having small dispensing openings. Such dispensing packages are successful in permitting dispensing of the material in small and regulatable quantities only when kept dry. Numerous attempts have been made to overcome the difficulties in dispensing hydroscopic materials from such packages in damp weather. All such attempts, as far as we have been aware, have consisted in adding to the ground hydroscopic material, an inert drying powder, usually a calcium compound or talc. While such expedients have some beneficial effect, they do not permit free and regulatable dispensing of the hydroscopic material in damp weather or in damp climates, unless the inert powder is added in so large a quantity that it seriously cuts down the amount of the desired hydroscopic material in the package.

We have discovered that the caking of ground hydroscopic materials in dispensing containers is due, in large extent, to the broken and irregular shapes of the ground particles which cause them to stick together as soon as they have become slightly moist by absorbing moisture from the atmosphere. This condition, we have found, cannot be effectively eliminated by the addition of an extraneous substance, since it is impossible to keep particles of the added substance between all the ground particles of the hydroscopic substance.

As a result of this discovery, we have departed altogether from the previous expedients used to assist in dispensing hydroscopic materials, and have invented a new special package of hydroscopic material in which caking of the material is prevented by placing the hydroscopic material in a form which prevents the sticking together of adjacent particles thereof, notwithstanding contact between the particles. Our invention consists essentially of a special package of hydroscopic material in the form of separate globules of approximately spherical shape enclosed in a container having a dispensing opening whose diameter is greater than that of the globules.

In order that the nature of our invention may clearly be understood, we have illustrated in the accompanying drawing, a special package of hydroscopic material embodying the invention. The drawing, which is an enlarged central section of the package, shows a container 10 having a sifter top 11 containing a plurality of dispensing openings 12. Enclosed within the container is a hydroscopic material (such, for example, as nitre cake) in globular form, that is, hydroscopic material (such as nitre cake) which has been filmed, sprayed or atomized while molten, so that it consists of separate globules 13 of approximately spherical form having hard smooth surfaces.

The particles 13 are of approximately uniform size, and are of materially less diameter than the dispensing openings 12. The particles 13, because of their spherical or spheroidal form, make only a point-to-point contact with each other and, for this reason, do not cake together, and, even when damp, may easily be shaken apart. In consequence, a stream of the globules may be discharged through the dispensing openings whenever desired, regardless of the dampness of the surrounding atmosphere, and the quantity may be nicely regulated.

What is claimed is:

1. A package of hydroscopic material designed to permit free flow of said material in damp weather, comprising a hydroscopic substance which has been fused and formed into globules, each of such globules thereby having only a point contact with adjacent globules, and a container therefor having a dispensing opening of a diameter greater than that of the globules.

2. A package of hydroscopic material designed to permit free and regulatable dispensing of said material in damp weather, comprising a container having a dispensing opening and a hydroscopic substance enclosed in the container, said substance having been fused and formed into globules of approximately spherical form, which make only a point-to-point contact with each other, so that, when dampened by the absorption of dampness from the atmosphere, they do not cake together in the container but flow freely through the dispensing opening of the container.

In testimony whereof we have hereunto set our hands.

CARL E. MENSING.
ROY E. WILEY.